Sept. 26, 1939.  O. M. WERMICH  2,173,893
WINDSHIELD DEFROSTER AND BODY VENTILATOR
Filed Sept. 19, 1935  2 Sheets-Sheet 1
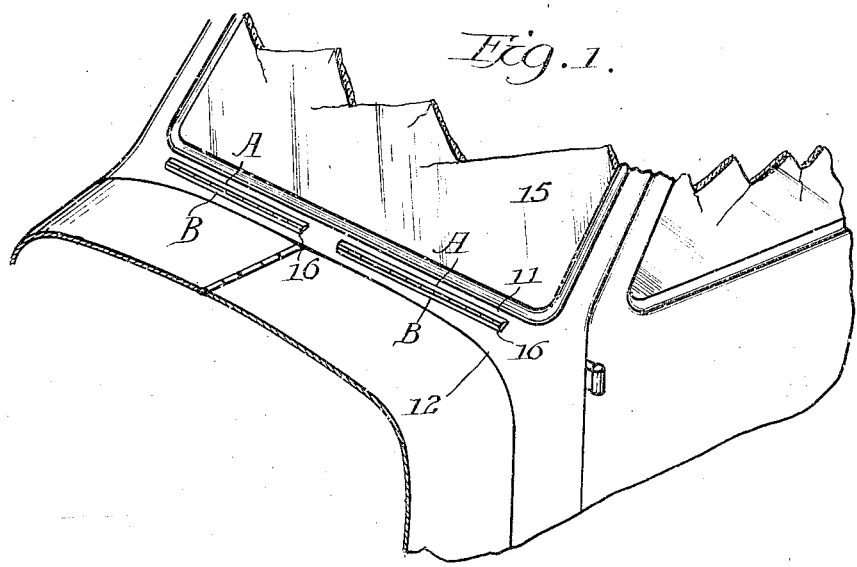
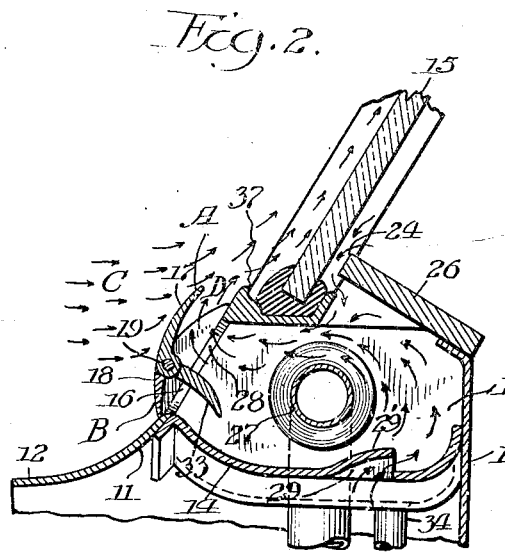
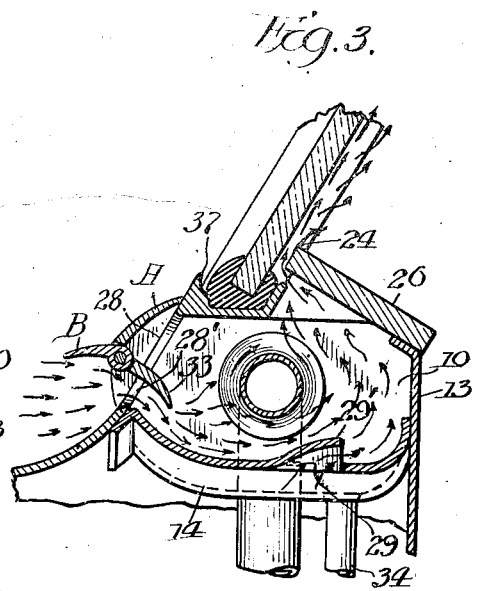
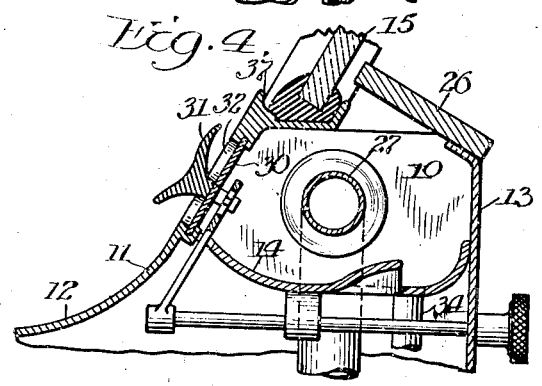

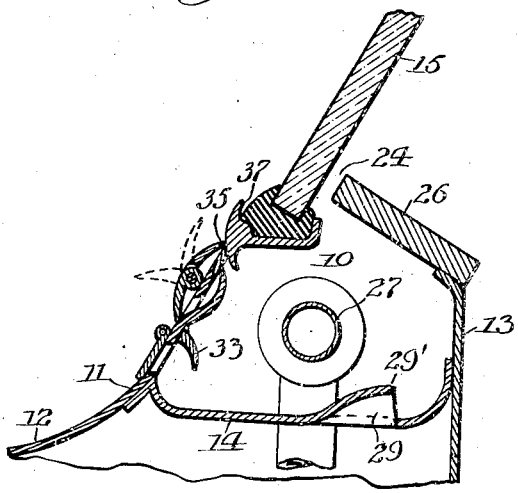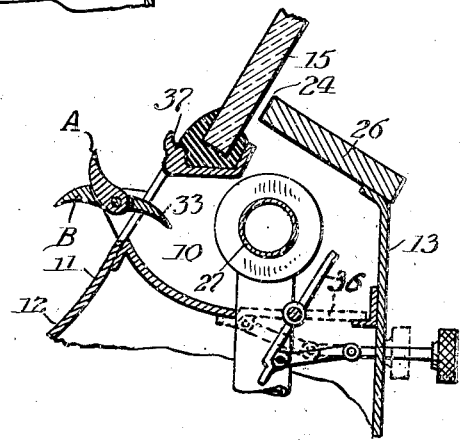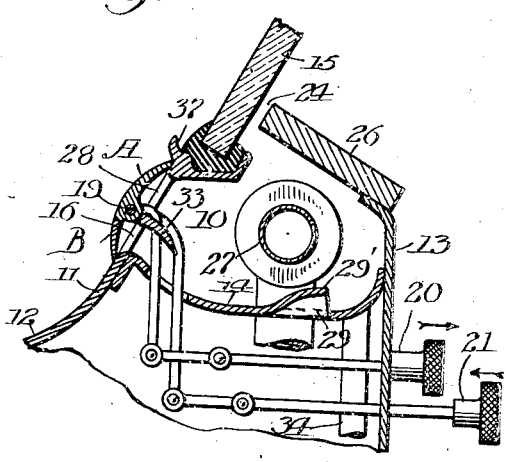

Patented Sept. 26, 1939

2,173,893

UNITED STATES PATENT OFFICE 2,173,893

WINDSHIELD DEFROSTER AND BODY VENTILATOR

Otto M. Wermich, Des Plaines, Ill.; Mary E. Wermich, administratrix of said Otto M. Wermich, deceased Application September 19, 1935, Serial No. 41,276

18 Claims. (Cl. 20—40.5)

The invention relates to a device for maintaining the wind shield of an automobile or other vehicle free of snow, sleet, ice, and other forms of condensation.

The invention has among its principal objects the provision of a simple device which will effectively accomplish the above objects and which is capable of functioning to maintain the outside and the inside of the wind shield free of condensate, in any of its various forms.

Another object of the invention is to employ a space produced by certain parts of the vehicle body located adjacent the lower edge of the wind shield as parts of an air passage or heater chamber, from which air may be delivered to the wind shield to thereby accomplish the above mentioned advantages.

It is therefore one object of the invention, to employ that space, located along the lower edge of the wind shield, bounded by the upper rear portion of the cowl of an automobile, and the upper portion of the instrument board or a portion extending therefrom, as an air passage, heater chamber, or as a combined heater chamber and air passage, whereby air is heated and delivered to wind shield.

It is also an object to utilize the formation of the cowl at the lower edge of the wind shield, as part of the means to assist delivery of air from said chamber to the wind shield, this portion of the cowl having an air outlet located adjacent the lower portion of the wind shield communicating with said chamber.

In addition it is an object of the invention to provide means causing air to be conducted to one side of the wind shield by air under pressure above atmospheric pressure and conducting air to the opposite side of said wind shield by pressure below atmospheric pressure.

It is another object of the invention to provide a structure the elements of which are arranged relatively to the wind shield to thereby provide a chamber or passage having one or more air outlets arranged relatively to the wind shield to effect the desired result upon travel or movement of the vehicle.

It is an object to arrange the air passage whereby air is delivered to the wind shield so that said passage bridges the wind shield and extends longitudinally of the wind shield, said passage having an air inlet and an air outlet, the latter being arranged to direct air toward the wind shield to remove condensate therefrom.

It is also an object of the invention to provide a device involving a construction capable of accomplishing a reversal of direction of air flow to thereby direct air to either side of the wind shield and accomplish the removal of condensate or prevent the formation thereof upon the wind shield.

In addition to the above, the invention also has as an object, the provision of means whereby air may be simultaneously delivered to both sides of the wind shield to accomplish removal of condensate from said wind shield.

Another object of the invention is to provide a structure having an air inlet and an air outlet for delivery of air to a face of the wind shield, having means combined therewith adapting the air outlet to provide an air inlet, to thus provide a structure capable of delivering air to either side of the wind shield.

It is an object to employ a heat exchange device and to arrange said device relatively to the passage so that the heat exchange device will function to increase the temperature of the air delivered to the wind shield.

Another object of the invention is to arrange the heat exchange device lengthwise of the passage, and also lengthwise of the wind shield, the heat exchange device being either of an electrical or other character, and may be tubular to thereby provide means capable of conveying heated liquid, or fluid, the tubular element being suitably connected with the circulatory system for the cooling medium for the engine or to the exhaust pipe of the engine, to thus convey heated fluid through the pipe and in this manner supply heat to air circulated through said passage for delivery to said wind shield.

Another object of the invention is to provide a construction whereby air is circulated from the interior of that portion of the vehicle body normally occupied by the occupants of the vehicle, to the outside of the vehicle and adjacent to the wind shield to thereby accomplish removal of condensation from the exterior of the wind shield and in addition remove foul air from the interior of the body of the vehicle.

In addition to the above it is an object of the invention to provide a structure whereby fresh air may also be supplied to the interior of the vehicle body.

The invention has these and other objects all of which will be explained in detail and more readily understood when read in conjunction with the accompanying drawings which illustrate various embodiments of the invention, it being manifest that other arrangements may be resorted to without departing from the spirit of the appended claims forming a part hereof.

In the drawings:

Figure 1 is a perspective view of a portion of an automobile body having the invention applied thereto.

Figure 2 is a detail sectional view showing certain parts illustrated in Figure 1 in section.

Figure 3 is a view similar to Figure 2 showing the elements arranged to perform a function different from that illustrated in Figure 2.

Figure 4 is a sectional view of a modified structure which may be employed.

Figure 5 is a sectional view showing a jet structure which may be employed to assist air flow from the heat chamber.

Figure 6 illustrates the structure functioning as a ventilator or heater for the car body.

Figure 7 illustrates a mechanism for actuating the shutters or deflectors of Figs. 2 and 3.

The invention will be explained in conjunction with that structure shown in Figures 2 and 3 which illustrate one embodiment of which the invention is susceptible, however, it is understood that reference to certain portions of this structure is made primarily to assist in a clear understanding of the structure and the manner in which this form of the device operates and functions, as other means may be substituted to effect the same advantages.

Therefore while devices designated A and B are at present considered as being preferable, devices other than those designated A and B may be resorted to to accomplish the desired end, as will be evident from the following. The device forming the basis of this invention as illustrated in Figs. 2 and 3 contemplates the use of an air passage generally designated 10 which is arranged transverse of the vehicle body and is preferably closed at its opposite ends. This air passage bridges the space between the upper rear portion 11 of the cowl 12, and the upper portion of the instrument board 13, the longitudinal edges of said space being respectively located upon opposite sides of the lower edge of the wind shield.

An element 14 is employed which is arranged below the wind shield, and may extend substantially throughout the width of the vehicle body or length of the wind shield 15, to provide a closure for the space generally designated 10 and complete the passage. This element 14 is curved so that any liquid occurring in the passage may drain and escape therefrom through certain drain connections provided for this purpose.

It is one of the principal objects of this invention to employ that space defined by this portion of the cowl, instrument board or similar element and the closure to provide an air passage having an air inlet and an air outlet the latter providing means through which air is delivered from said passage to the wind shield, the passage formed by these elements being also capable of use to supply air to the interior of the vehicle body or to exhaust air therefrom to thereby ventilate the interior of the body.

In the disclosure of the invention as illustrated in Figs. 2 and 3 the upward curved portion 11 of the cowl is provided with a plurality of apertures generally and respectively designated 16, which are respectively located upon opposite sides of the center of the vehicle body and communicate with the passage 10. These apertures are normally closed when the device is functionally inoperative. Since the closures for the openings or apertures 16 correspond with each other as to construction and function an explanation of one will suffice for an understanding of both.

The particular closure illustrated for closing the respective openings 16, contemplates the use of two deflectors which in the present instance act as shutters designated 17 and 18 which are, respectively hinged at 19 to allow independent operation of said closures, but may, however, be of a stationary character instead of being hinged as shown.

These shutters are capable of manipulation to and from closed position, to open and close the respective apertures 16, and are actuated through the agency of the mechanism generally and respectively designated 20 and 21, which may be manipulated from the inside of the vehicle.

It will be noted that a space or opening 24 is provided between the wind shield 15 and an edge of the element 26 of the instrument board 13. As will presently be seen, this space 24 in one instance provides an air inlet to the heater chamber and in another provides an air outlet therefrom and in the latter instance assists in presenting air to the inner surface of the wind shield, the latter being inclined inwardly or toward the interior of the vehicle body.

A heat exchange device 27, is located in or adjacent the passage 10, and this heat exchange device is, in the structure illustrated of a tubular character, it being understood that this device is provided with heat radiating fins and has its opposite ends connected with the circulatory system for the cooling medium of the engine and may when found necessary, have a portion thereof in engagement with the exhaust manifold to advance the period of temperature rise of this liquid or, may be connected with the exhaust manifold of said engine to thus employ these gases as the heating medium.

It is pointed out that this heat exchange device also may be of an electrical character, and in either event this heat exchange device is valve or switch controlled.

Presume for the purpose of illustration that snow, sleet or ice has formed, or is forming, upon the outside of the wind shield. To eliminate this condition, the deflector shutter A is moved to the full line or open position thereof shown in Figure 2. Upon movement of the vehicle, air currents C are created, some of which travel upwardly over the deflector or shutter A and across the inclined wind shield and therefore will create an area of pressure in rear of the shutter, below atmospheric pressure, in the vicinity of D, which by aspiration causes air to be drawn from the chamber 10. This area of pressure, below atmospheric pressure and movement of the air currents C, causes air to be drawn from the interior of the vehicle body through the air inlet opening 24 and inlets 29, into engagement with the heat exchange device 27, this heated air being subsequently discharged through the opening 28.

This heated air travels upwardly, relatively to the wind shield and by virtue of its heated condition will cause melting of any frozen condensation, which may have accumulated upon the wind shield, and will in addition prevent the subsequent formation thereof on the wind shield. The element 14, which forms the closure for the space or passage 10, is provided with one or more air ports 29 having deflectors such as 29'. These air ports allow air to be drawn from the interior or occupant space of the vehicle body, into engagement with the heat exchange device which thus heats this air and prepares same for application to the outside of the wind shield, to cause melting of any frozen condensate applied to the outer surface of the wind shield.

Manifestly, when the elements of the device are disposed to perform this function, foul air, tobacco smoke, etc. will be removed from the interior of the vehicle body.

From the explanation of the structure thus far explained, it is believed evident that when the elements are in the relative relation shown in Figure 2, the structure functions to accomplish the advantage of removing and preventing the formation of ice and sleet and the accumulation of snow upon the outside of the wind shield.

As before stated the structure illustrated in Figs. 2 and 3 also provides means for preventing the formation of condensation upon the inside of the wind shield, and is also capable of functioning to remove any condensation already formed upon this portion of the wind shield and in addition provides means for supplying fresh heated air to the interior of the vehicle body to thus assist in maintaining the interior of the body at a comfortable temperature.

To accomplish this last mentioned advantage and force heated air toward and into engagement with the inner face of the wind shield, the reflector or valve A is closed and the valve or shutter B is opened.

This allows outside air to enter the passage 10 through the aperture 28' as indicated by the arrows. Air introduced to the chamber or passage 10 through the aperture 28' engages the heat exchange device, becomes heated thereby and is ejected in its heated condition through the opening or space 24, which in this instance now functions as a discharge or outlet from the air passage 10 instead of an inlet to said passage as previously explained.

It will be noted that these last mentioned air currents traveling through the passage 10 travel in a direction reverse from that course of travel of the air currents when the shutter or valve A is open.

It is believed evident that under certain conditions the device is capable of functioning to prevent formation upon and removal of condensation from the inside of the wind shield without requiring opening of the shutter B, and therefore this shutter may be dispensed with should this last mentioned arrangement be found more desirable. Since the heat exchange device is located in the chamber 10 along the lower edge of the wind shield, below the opening 24, air in the chamber 10 when heated will rise and travel through the opening 24 and engage the inner surface of the wind shield and thus in this manner prevent the formation of condensate upon this portion of the wind shield.

Air at this time may be introduced to the chamber 10 through the air inlets 29, and thus a constant flow of heated air will be directed into functional engagement with the inner surface of the wind shield and in this manner accomplish the desired end.

The heated air, discharged from the outlet 24, travels across the inner face of the wind shield which it will be noted is inclined relatively to the passage 24 and since this air is of a dry, warm, character any condensation appearing on the inside of the wind shield will disappear and will thereafter be prevented from forming.

Air is at this time also introduced to the passage 10, through the air inlet ports 29, as previously explained and in this manner assists in preventing the formation of condensation upon this surface of the wind shield. It may be here stated that the device will function to eliminate formation of condensate upon the interior of the wind shield without heating of the air prior to its application to the interior of the wind shield, as it is well known that a draft of cold dry air will accomplish the desired end and therefore it must be understood that heating of this air is resorted to in order to accomplish the dual function of presenting warm, dry air to the wind shield when necessary and also to maintain the interior of the vehicle body at a desired temperature without subjecting the occupants of the vehicle to the inconvenience of cold drafts, which results when only cold unheated air is applied to the interior of the wind shield.

It is understood that these shutters or valves are disposed lengthwise of the wind shield and are arranged in close proximity to the lower edges of the wind shield, so that air currents engaging the deflector shutter A will create the before mentioned action and deliver heated air to the outer face of the wind shield which by virtue of travel across the wind shield will assist in causing the device to function in preventing the formation and accumulation of condensation in its various forms upon the outside of the wind shield. It is also believed evident that opening of the shutter B causes air under pressure to be delivered to the inside of the wind shield and thus will remove and prevent the formation of condensate upon this portion thereof.

A baffle 33 is arranged with respect to the opening 28' so that any rain or other liquid directed toward and entering the chamber 10 through the opening 28' will be deflected toward the bottom of the chamber, which as before stated, is curved lengthwise thereof to provide for drainage of the chamber. This deflector will materially reduce the possibility of engagement between the liquid entering the chamber and the heat transfer device.

As before stated, the construction of the valves or shutters designated A and B, for controlling operation of the device, may be varied from that shown in Figures 2 and 3, in any one of a number of ways, for instance, a structure such as that illustrated in Figure 4, may be substituted therefor.

This last mentioned construction, may involve the use of a slide valve such as that designated 30. In this event a stationary deflector 31 is provided and arranged relatively to the opening 32, to accomplish the action referred to in the description of the structure shown in Figures 2 and 3, the deflector 31 functioning in a manner similar to the shutter A when open.

It will also be noted that in this disclosure the controlling means or shutters are located interiorly of the passage 10 and manifestly, hinged shutters may be employed and located interiorly of the passage should a structure such as this be found more desirable.

The structure is also capable of providing means for supplying heat to the interior of the vehicle body and in addition may function as a ventilator therefor. To provide a structure for accomplishing these advantages, the element forming the closure for said passage or chamber 10 is provided with a hinged element 36 which when open produces a communication between the chamber 10 and the interior of the vehicle body and thus upon opening of the lower shutter B fresh heated or unheated air is driven into the vehicle body. It will be noted that a gutter 37 is provided and arranged along the upper portion of the upper opening such as 28, this gutter being provided to assist in preventing the introduction of water from the wind shield to the heater chamber or air passage 10.

The device is also capable of functioning to simultaneously apply air to the opposite sides of the wind shield. To accomplish this advantage both deflectors or shutters A and B are opened, which allows air to enter the chamber or passage 10 through the opening 28', which causes a portion of the air entering the chamber 10 to be discharged through the outlet passage 24 while another portion is discharged from the chamber 10 through the opening 28 for application to the outer face of the wind shield by air above atmospheric pressure.

Means for filtering air circulating through said air passage or chamber 10 may also be employed and may be formed of steel wool located in said passage.

A water passage such as 34 may be connected with the chamber 10 to convey water from the chamber should any find its way to the heat chamber and air passage 10. This water outlet will discharge at some convenient point outside of the interior of the body of the vehicle.

A structure forming means affording a jet action may also be employed to facilitate functioning of the device. This structure is designated 35 and may be formed in the cowl as shown.

From the foregoing description of the invention it is believed evident that a structure is disclosed which utilizes that space located along the lower portion of the wind shield, defined by this portion of the wind shield, the adjacent inner edge portion of the cowl and the instrument board, to provide a chamber for the heat exchange device and/or a passage for air for delivery to either side of the wind shield, which thereby causes these portions of the vehicle body to perform a function in addition to their ordinary or usual functions.

It is believed manifest that the elements including the cowl, instrument board, etc. provides a convenient space which may be readily transformed into an air passage extending along the lower edge of the wind shield lengthwise thereof, which also extends transverse of the wind shield and provides means for delivering air to the face of the wind shield and that this portion may be provided with air inlet and outlet ports as herein described or be provided with an air inlet which communicates with the engine chamber or some other source of heat instead of with atmosphere as herein shown and described, to thus provide means for accomplishing the above advantages without the necessity of a heat exchange device located in said chamber.

It is further evident that the chamber or air passage bridges the space extending across the lower edge of the wind shield. It is also believed manifest that by combining a heat exchange device, with a chamber located as above referred to and bounded by said elements of the vehicle body, that heat may be supplied to air and be delivered to the windshield to perform the work of removing condensation from the wind shield.

In addition to the above, it is also readily seen that, the invention contemplates and provides means for changing or reversing the direction of flow of the air currents through said passage or chamber to thereby deliver air to the wind shield and accomplish removal and prevention of the formation of condensation upon the wind shield, and furthermore, movement of air is in one instance caused through the medium of air under pressure below atmospheric pressure and in the other instance this travel is caused by air above atmospheric pressure.

It is also thought evident that by arranging the heat exchange device in close proximity to the wind shield that the temperature of the wind shield will be increased and will in this manner assist in preventing the accumulation of condensation upon the wind shield.

Having thus described the invention what I claim and desire to cover by Letters Patent is:

1. In a device of the kind described the combination with a wind shield of a vehicle, means providing a passage for conducting air to the opposite sides of a wind shield and means for causing circulation of air in opposite directions in said passage and delivering said air to the respective sides of said wind shield.

2. In a device of the kind described adapted to deliver heated air to a wind shield, the combination with a wind shield of a vehicle, and means causing air to be heated and conducted to one side of the wind shield by air under pressure above atmospheric pressure and conducting air to the opposite side of said wind shield by pressure below atmospheric pressure.

3. In a device of the kind described the combination with a wind shield of a vehicle, means providing an air passage having an air inlet and air outlets the latter terminating on opposite sides of the plane of the wind shield and means associated with said passage causing circulation of air in opposite directions in said passage and delivering air through said outlets to the opposite sides of said wind shield.

4. In a device of the kind described, the combination with a wind shield, means providing an air passage, said wind shield being located between the extremities of said passage and means causing air to be introduced to said passage through one end thereof and discharged from the opposite end toward one side of said wind shield and causing air to be introduced to said last mentioned end and discharged through the first mentioned end toward the opposite side of said wind shield.

5. In a device of the kind described, the combination with a wind shield, means providing an air passage, said wind shield being located between the sides of said passage and means causing air to be introduced to said passage through one side thereof and discharged from the opposite side toward one side of said wind shield and causing air to be introduced to said last mentioned side and discharged through the first mentioned side toward the opposite side of said wind shield and a heat exchange device arranged relatively to said passage to engage air circulating through said passage.

6. In a device of the kind described the combination of a wind shield of a vehicle and means arranged transversely of the body of the vehicle forming an air passage, said passage having an air intake, opening exteriorly of the vehicle body the longitudinal edges of said passage terminating upon opposite sides of the plane of the wind shield, said passage providing means for delivering air to the opposite sides of said wind shield.

7. A device for removing condensation from a wind shield of a vehicle and preventing formation of condensate thereon, the combination of means forming a chamber arranged transverse to the length of a vehicle body along and below the lower edge of said wind shield, a heat exchange device arranged transverse of said vehicle body in said chamber, said chamber having an air inlet arranged exteriorly of said body and an air outlet the latter providing means for directing air toward the wind shield and said inlet, outlet, and heat exchange device being arranged in intimate relation to each other and said passage providing means for conveying air directly from said inlet to said outlet.

8. A device providing a chamber having a fluid conducting heat exchange device providing a casing enclosing said heat exchange device and said chamber associated therewith providing means for removing and preventing the formation of condensation upon a wind shield in juxtaposition to said chamber, said chamber having an air inlet through which air above atmospheric pressure is introduced to said chamber and a plurality of outlets the latter providing means delivering air to the opposite surfaces of said wind shield.

9. A device providing a chamber having a fluid conducting heat exchange device associated therewith providing means for removing and preventing the formation of condensation upon a wind shield in juxtaposition to said chamber, said chamber having an air inlet and an air outlet in one wall of said chamber and an air outlet in the opposite wall of said chamber, said outlets respectively providing means delivering air to the opposite surfaces of said wind shield and means controlling flow of air from the respective outlets.

10. A device providing a chamber having a fluid conducting heat exchange device enclosed by said chamber and providing means for removing and preventing the formation of condensation upon a wind shield in juxtaposition to said chamber, said chamber having an air inlet and a plurality of outlets the latter providing means delivering air to the opposite surfaces of said wind shield and independently operable means for controlling flow of air through the respective outlets.

11. A device providing a chamber having a fluid conducting heat exchange device intimately associated therewith providing means for removing and preventing the formation of condensation upon a wind shield in juxtaposition to said chamber and heat exchange device, said chamber having an air inlet and a plurality of air outlets through which air under pressure above atmospheric pressure is delivered to the opposite sides of said wind shield.

12. A device providing a chamber having a fluid conducting heat exchange device intimately associated therewith providing means for removing and preventing the formation of condensation upon a wind shield in juxtaposition to said chamber and heat exchange device, said chamber having an air inlet and a plurality of air outlets through which air under pressure above atmospheric pressure is delivered to the opposite sides of said wind shield and means for selectively controlling flow of air to said wind shield.

13. In a device of the kind described the combination of means providing a chamber having means combined therewith for heating air, said chamber being formed to provide means through which air is delivered to a wind shield from said chamber, said last mentioned means providing means for drawing air from said chamber.

14. A device providing a chamber having a heat exchange device intimately associated therewith providing means for removing and preventing the formation of condensation upon a wind shield in juxtaposition to said chamber, said wind shield being part of a vehicle body having a cowl, said cowl having openings provided herein communicating with said chamber, one of said openings providing an air inlet opening and the other an air outlet from said chamber through which air is delivered to said wind shield and means at said last mentioned opening controlling flow of air through said last mentioned opening.

15. In a device for removing and preventing the formation of condensate upon a wind shield of a vehicle having a body, the combination of a chamber having an exteriorly opening air inlet and an exteriorly arranged air outlet, the latter providing means through which air is delivered to said wind shield by air current induced by the velocity of air entering said inlet and a heat exchange device for heating said air.

16. In a device for removing and preventing the formation of condensate upon a wind shield of a vehicle having a body, the combination of a chamber having an exteriorly opening air inlet and air outlets adjacent the inlet respectively located upon opposite sides of the plane of the wind shield providing means through which air is delivered to said wind shield by air currents induced by the velocity of air entering said inlet and a heat exchange device for heating said air.

17. In a device for removing and preventing the formation of condensate upon a wind shield of a vehicle having a body, said body having an air inlet arranged exteriorly thereof, means providing an air passage extending unilaterally from said inlet toward and beyond the inner surface of said wind shield and terminating in an air outlet and providing means for deflecting air toward said air outlet, said outlet being arranged to direct air into engagement with the interior surface of said wind shield and having means for directing air toward the outer surface of said wind shield.

18. In a device for ventilating and heating the interior of a vehicle body having a wind shield and preventing the formation and accumulation of condensate upon said wind shield, said body having an opening providing an air intake opening, said device being comprised of a chamber having means communicating with said intake opening and having air outlets respectively delivering air to opposite sides of a wind shield and in a direction other than towards said wind shield and a heat exchange device located with respect to said chamber to heat air prior to its delivery from said chamber.

OTTO M. WERMICH.